No. 889,983. PATENTED JUNE 9, 1908.
C. E. STORM.
CORN HUSKING MACHINE.
APPLICATION FILED MAR. 21, 1907.
3 SHEETS—SHEET 1.
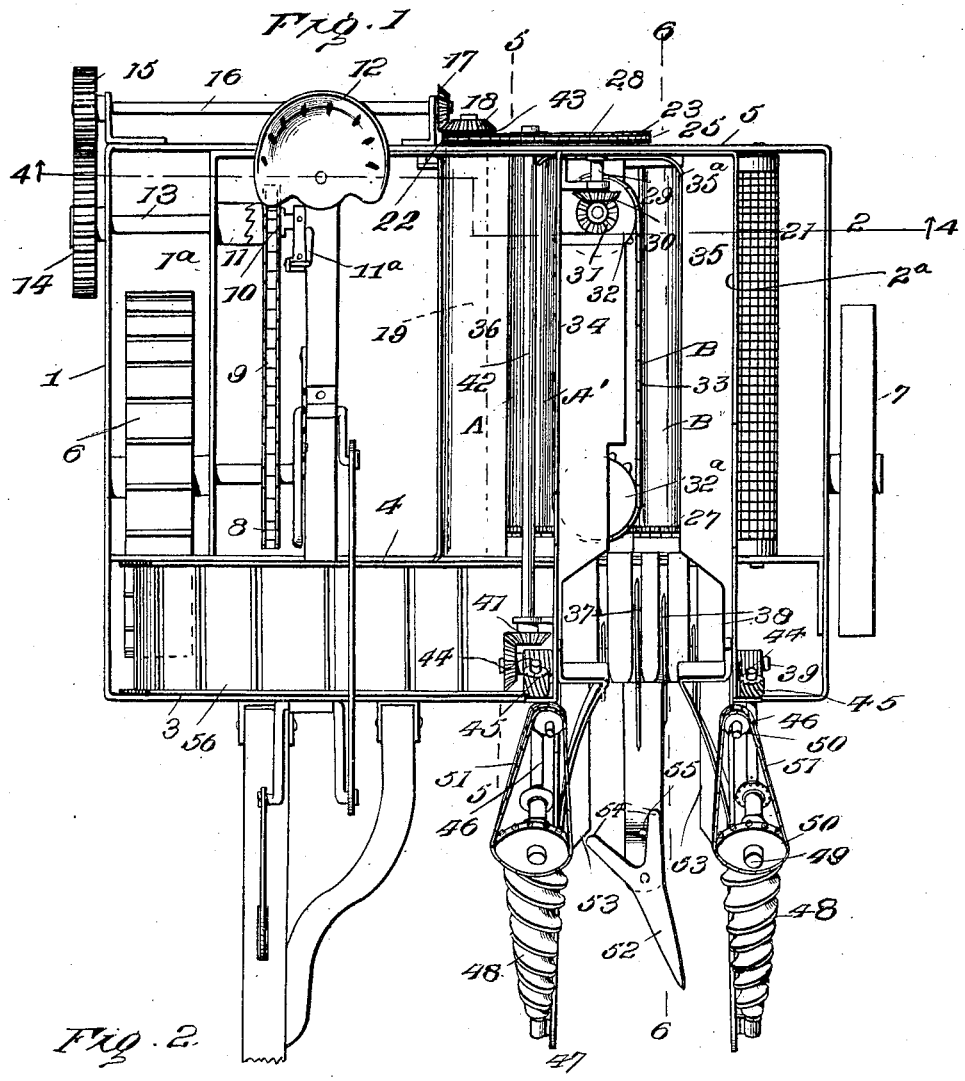
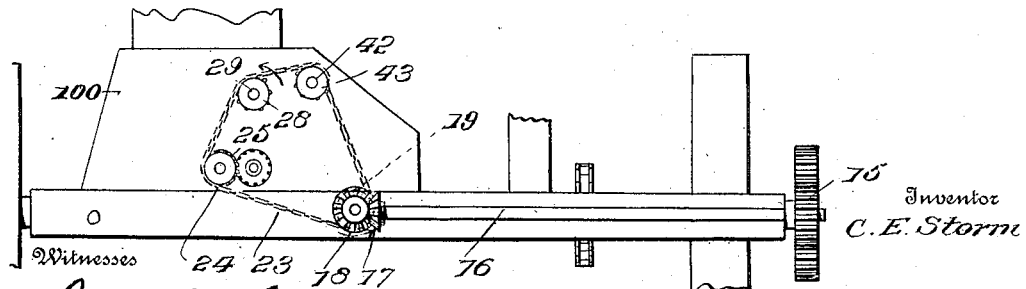

No. 889,983. PATENTED JUNE 9, 1908.
C. E. STORM.
CORN HUSKING MACHINE.
APPLICATION FILED MAR. 21, 1907.
3 SHEETS—SHEET 2.
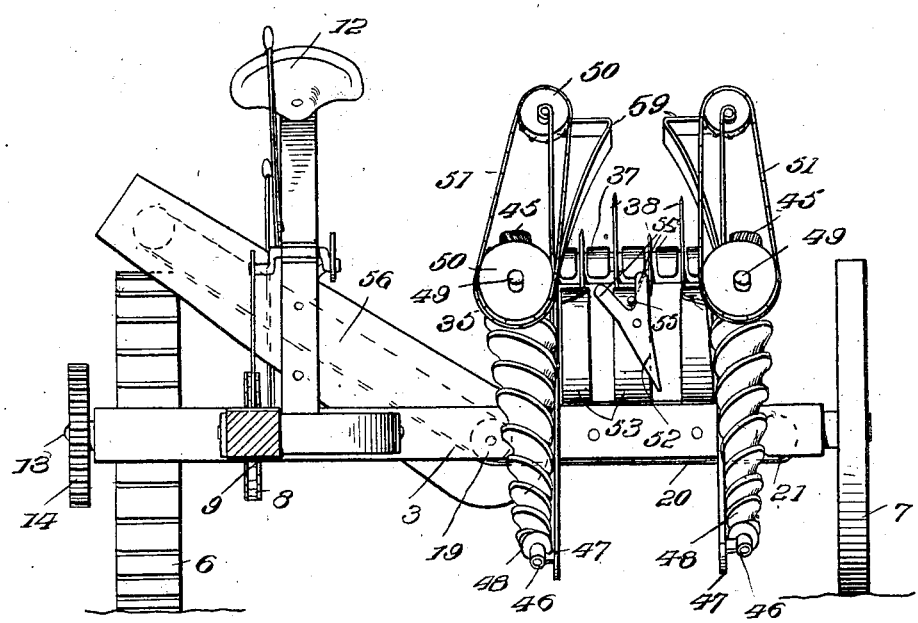
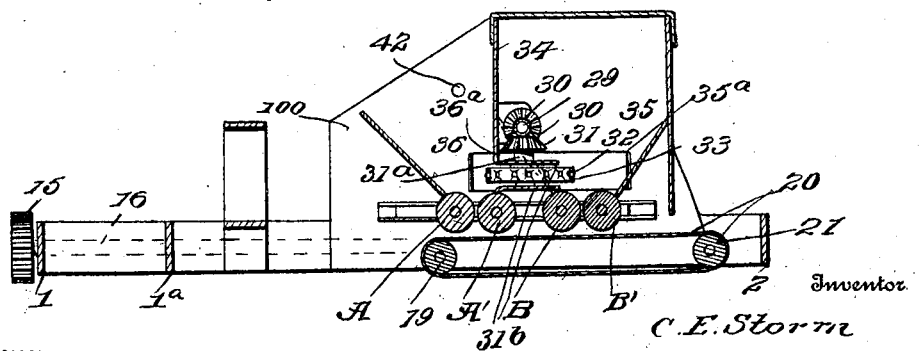

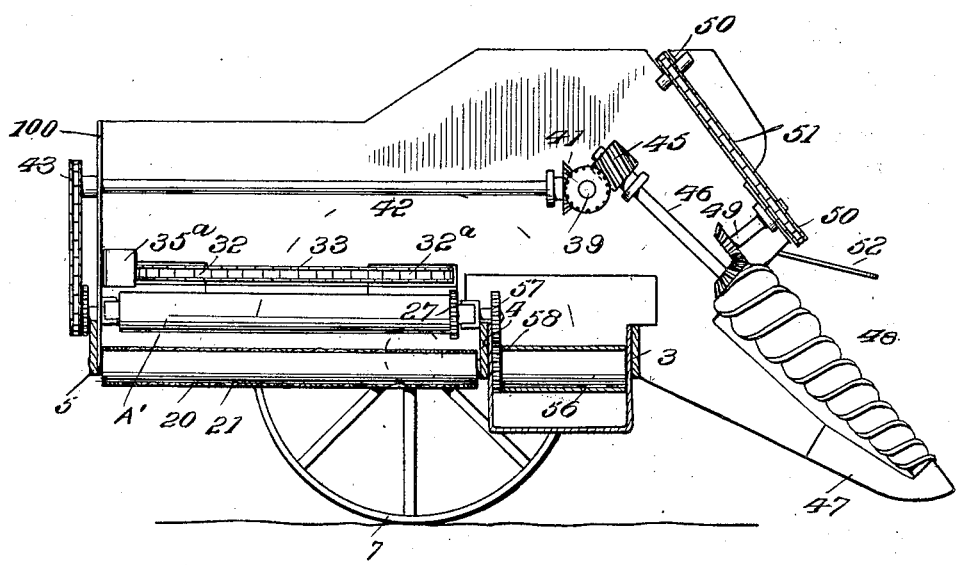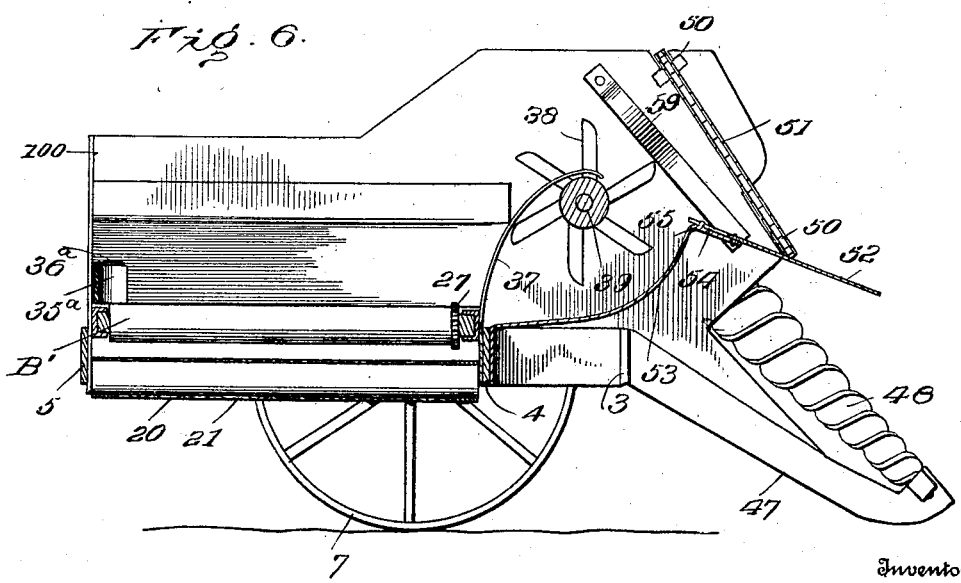

UNITED STATES PATENT OFFICE.

CHARLES E. STORM, OF TROWBRIDGE, ILLINOIS.

CORN-HUSKING MACHINE.

No. 889,983.   Specification of Letters Patent.   Patented June 9, 1908.

Application filed March 21, 1907. Serial No. 363,637.

*To all whom it may concern:*

Be it known that I, CHARLES E. STORM, citizen of the United States, residing at Trowbridge, in the county of Shelby and State of Illinois, have invented certain new and useful Improvements in Corn-Husking Machines, of which the following is a specification.

This invention comprehends certain new and useful improvements in corn harvesting machines of that type that embody husking mechanism and stripping mechanism so as to strip the ears of corn from the stalks in the field, and remove the husks from the ears and convey and discharge the husked ears into a wagon or similar receptacle as the implements travel over the fields, and the present invention deals particularly with the husking mechanism of the machine.

The invention has for its object an improved construction and arrangement of parts of husking means in a machine of this type and consists in the details of constructions, arrangements and combinations of the parts that I shall hereinafter fully describe and claim.

For a full understanding of the invention reference is to be had to the following description and accompanying drawings, in which:

Figure 1 is a top plan view of a corn husking machine embodying the improvements of my invention. Fig. 2 is a view looking at the rear of the machine, parts being broken away and other parts omitted. Fig. 3 is a front elevation of the machine. Fig. 4 is a transverse sectional view on the line 4—4 of Fig. 1; and, Figs. 5 and 6 are longitudinal sectional views on the lines 5—5 and 6—6 respectively of Fig. 1.

Corresponding and like parts are referred to in the following description and indicated in all the views of the drawings by the same reference characters.

The framework of my improved corn husking machine may be of any general structure such as is common or suitable for the machine to travel over the fields and, in the present instance, the said framework embodies longitudinal sills 1 and 1$^a$, 2 and 2$^a$, and front, intermediate and rear cross bars 3, 4 and 5.

6 and 7 designate respectively the traveling wheels which are journaled in the framework, the traveling wheel 6 being the driving or power wheel. The axle of this wheel 6 has a sprocket wheel 8 secured on it, said sprocket wheel being operatively connected by a chain 9 to the sprocket wheel 10 formed with a clutch 11 adapted to be actuated by any form of hand lever 11$^a$ from the driver's seat 12 so as to couple and uncouple the sprocket 10 to and from the shaft 13 on which it is mounted. At its outer end the shaft 13 carries a spur gear 14 which meshes with a spur pinion 15 on a transversely extending shaft 16 journaled at the rear end of the framework as best seen in Figs. 1 and 2. The inner end of the shaft 16 carries a bevel pinion 17 meshing with a similar pinion 18 on the shaft of a longitudinally extending roller 19 (see Figs. 1, 2 and 4). This roller 19 is located about the middle of the framework and forms one supporting member of the transversely movable endless apron 20 which is preferably composed of leather belts and a wire mesh body portion connected thereto, a roller 21 being also employed to support the said apron in its traveling movement.

Above the apron 20 (see Fig. 4) are four husking rolls A, A', B, B' journaled in the framework and extending longitudinally thereof. The shaft of the roller 19 carries a sprocket wheel 22 at its rear end just in advance of the beveled pinion 18 and over said sprocket wheel there passes a chain 23 which engages a sprocket 24 on the shaft of the husking roll B so as to drive such roll. The shaft of the husking roll B carries a spur pinion 25 meshing with the similar pinion of the adjacent roll A so as to effect a driving connection from one pair of rolls to another. The opposite ends of the rolls of the respective pairs carry meshing pinions 27 hence as the rolls rotate, the rolls A, A' will turn toward each other as will also the other rolls B, B' in a manner to husk the ears of corn and drag the husks downwardly on the transversely traveling apron 20, whence they will pass to the side and fall to the ground, while any grains of corn that may happen to be broken off in the husking operation will fall between the wires of the apron and may be caught by any desired receptacle or conveyer (not shown) and saved.

The chain 23 at the rear of the framework also passes over a sprocket wheel 28 on a stub shaft 29 and said shaft carries at its front end a bevel pinion 30 meshing with a similar and horizontally disposed pinion 31 on a stub shaft 31$^a$. The shaft 31$^a$ is journaled in and supported by upper and lower bearing plates 31$^b$ so as to turn about a vertical axis and the said shaft carries a sprocket wheel 32. An endless sprocket carrier 33 passes over the sprocket 32 and over a similar sprocket 32$^a$ in advance of the sprocket 32 and in longitudinal alinement therewith, and both of these sprockets project outwardly over the two pairs of husking rolls and from a partition 34 which stands between the two troughs 35 and 36, one alongside of the other. The two troughs 35 and 36 are preferably formed of sheet metal plates that extend longitudinally of the machine and that are secured at their rear ends in any desired way to a vertically-disposed transversely-extending plate 100 secured to the rear cross bar 5, as best seen in Figs. 2 and 4. As the sprocket carrier 33 moves, it will engage the ears of corn entering the feeding end of the trough 35 which will thus be caused to travel rearwardly along the husking rolls B, B' to the rear end of the trough 35, whence the ears will be deflected laterally by means of a curved plate 35$^a$ secured in any desired way to the rear plate 100. The ears are thus passed through an opening 36$^a$ in the partition 34 and receive a further action by the rolls A, A', as the ears are then carried forwardly again by the opposite stretch of the sprocket carrier 33. Hence it will be seen that by a very compact arrangement the corn will be treated by two pair of husking rolls and a thorough stripping of the husks effected, while the husks will be disposed on the endless apron 20 and discharged underneath the machine, any grains that are broken off in the operation falling through said endless apron into any desired form of receptacle. The husked ears, as they pass out of the front end of the trough 36, will be caught up and carried into a wagon or other receptacle alongside of the machine by means of a transversely extending elevator 56 driven by means of a spur pinion 57 on the front end of the shaft of the roller 19, as indicated in Figs. 3 and 5 and a similar meshing pinion 58 on the lower elevator roller.

37 designates spaced fingers which project upwardly and forwardly from the receiving end of the trough 35, as clearers for the snapping fingers 38 that revolve in vertical planes in the spaces between said fingers 37, said fingers 38 being mounted upon the transversely extending shaft 39 journaled in the side walls of the receiving trough 35. In order to drive the snapping fingers 38, the shaft 39 is provided at one end with a bevel pinion 40 that meshes with a similar pinion 41 on a longitudinally extending shaft 42 extending rearwardly above the discharge trough 36. At its rear end, the shaft 42 carries a sprocket 43 which is driven by means of the sprocket chain 23 above mentioned.

The shaft 39 is provided at its ends outside of the receiving trough 35 with worms 44 meshing with worm gears 45 on the oblique shafts 46 which are journaled in the sides of the trough and in their lower ends with step bearings in the forwardly extending curved brackets 47. The shafts 46 carry spiral guards 48 which effectively serve the purpose of taking up stalks of corn that may be prostrate and carrying them upwardly for action by the feeding chains 51. In order to drive the feeding chains 51, I mount them upon upper and lower sprocket wheels 50, the lower sprocket wheels being mounted on stub shafts 49 that receive their motion by means of a bevel pinion connection with the shafts 46.

In connection with the parts before described, I have shown a pointer 52 which, together with its correlated parts, forms the subject matter of a separate application for Letters Patent a divisional of this case, Serial No. 397,692, filed October 16, 1907. This pointer is pivotally mounted intermediate of its ends on the intermediate one of three forwardly extending spaced tongues 53 projecting from the bottom of the receiving trough 35. The pointer 52 is deflected slightly in a downward direction on the intermediate tongue, and the rear end of the pointer is forked as indicated at 54. Either member of this pointer is designed to engage with a stop 55. By turning the pointer to the right, the machine will feed the hill on the left, while if it be turned to the opposite limit of its movement it will feed the machine with the hills to the right.

As the operation of the various parts of the husking mechanism has been described in connection with their construction it is believed that the complete operation of the machine is obvious and that further description thereof is unnecessary.

Having thus described the invention, what is claimed as new is:

1. In a corn husking machine, two pairs of longitudinally extending horizontal husking rolls set side by side, troughs mounted above the said pairs of rolls respectively and in communication therewith, there being an opening establishing communication between the rear ends of said troughs, a sprocket carrier ranging longitudinally of the trough with one stretch in one trough and the other stretch in the other, means for driving the said carrier whereby the ears will be carried rearwardly and forwardly in the other trough so as to receive husking action from both pairs of rolls, an endless reticulated apron mounted underneath both pairs of rolls and traveling transversely thereof, and means for actuating said apron.

2. In a corn husking machine, the combination of two pairs of longitudinally extending husking rolls set side by side, troughs mounted above the said pairs of rolls respectively and in communication therewith, there being an opening establishing communication between the rear ends of said troughs, means for conveying the corn rearwardly in one trough and thence to the other trough and forwardly in the latter so as to receive the action of both pairs of husking rolls, a driving connection between the two pairs of husking rolls, an endless apron mounted underneath both pairs of husking rolls and arranged to travel transversely thereof, means for driving said apron, and a driving connection from said apron to one of the husking rolls.

3. A corn husking machine comprising a traveling framework, husking rolls mounted therein and extending longitudinally thereof an endless apron mounted in the framework underneath the husking rolls and arranged to travel transversely thereof, roller supports for said apron journaled in the framework, means for driving one of said supporting rollers, a sprocket wheel mounted at the rear of the machine on the rear end of said driven roller, a similar wheel on the rear end of one of the husking rolls, a gearing connection between said rolls, a sprocket chain extending around said sprocket wheels whereby to drive the rolls over the driven roller of the endless apron, a sprocket carrier mounted in the framework and adapted to carry the corn along the rolls, said carrier including the sprocket wheels, one of which is at the rear end of the machine, said wheels being horizontally disposed, a vertically disposed shaft on which the rear sprocket wheel of the carrier is mounted, a bevel pinion gear on the front end of said shaft, another bevel pinion meshing with the first named bevel pinion, a horizontally disposed stub shaft mounted in the framework and carrying said last named bevel pinion on its front end, and a sprocket wheel on the rear end of said stub shaft, said sprocket wheel being engaged by the sprocket chain first mentioned whereby to drive the sprocket carrier.

In testimony whereof I affix my signature in presence of two witnesses.

CHARLES E. STORM.

Witnesses:
   E. J. McCLORY,
   OLIVER SHEFFLER.